UNITED STATES PATENT OFFICE.

JARED HENRY BEAMER, OF BRAMPTON, CANADA.

FABRIC.

SPECIFICATION forming part of Letters Patent No. 671,812, dated April 9, 1901.

Application filed July 12, 1900. Serial No. 23,410. (No specimens.)

*To all whom it may concern:*

Be it known that I, JARED HENRY BEAMER, a citizen of Canada, residing at Brampton, in the Province of Ontario, Dominion of Canada, have invented new and useful Improvements in Fabrics, of which the following is a specification.

My invention relates to improvements in that class of fabrics which are treated with a view of rendering them impervious to moisture; and it consists in the incorporation of a certain composition hereinafter described and claimed with a woven fabric, whereby is produced a fabric which is a non-absorbent and is indestructible from moisture, mildew, and decay and one which is extremely strong and durable and which when interposed between and connected by vulcanization to two layers of rubber forms a solid substance which is resilient and of such character that it is not liable to be punctured, but when punctured is susceptible of being quickly and easily repaired. It follows from the foregoing that my improved fabric is especially adapted for the manufacture of fire and garden hose, rubber boots, lumbermen's overs, and machinery-belting and is also calculated to be used to advantage in the making of automobile, carriage, and bicycle tires.

In manufacturing my improved fabric I first prepare two solutions, which for convenience of description will hereinafter be referred to as solution A and solution B.

The solution A is composed of the following ingredients, combined in about the proportions stated, viz: gum-mastiche, four drams; gum-shellac, eight drams; gum-sandarac, four drams; methylated spirits, two fluid ounces. The three gums mentioned are reduced to a powder and are thoroughly dissolved in the methylated spirits.

The solution B is composed of the following ingredients, combined in about the proportions stated, viz: gum-asphaltum, one ounce; Burgundy pitch, one-half ounce; spirits of turpentine, three fluid ounces. The gum-asphaltum and Burgundy pitch are reduced to a powder and dissolved in the turpentine spirits, and the whole is heated to a boiling-point—that is, to a temperature of about 212° Fahrenheit. After the temperature of solution B is reduced below the boiling-point the solutions A and B are commingled in a single vessel in the proportions of thirty-five per cent., by volume, of the former to sixty-five per cent., by volume, of the latter, and the mixture is stirred or otherwise agitated, and its temperature is raised to the boiling-point. While the composition described is in a highly-heated state the woven fabric is passed therethrough, or the composition is applied to the fabric by a brush or other means until the opposite sides of the fabric are entirely covered and the interstices thereof thoroughly occupied by the composition. When the composition is thus incorporated with the woven fabric, the strands of the latter are fully impregnated with and coated by the composition, and when the opposite sides of the prepared fabric are rubbed the interstices of the woven fabric are entirely occupied by the composition and air is excluded therefrom, so that when the prepared fabric is interposed between and connected by the vulcanizing process to two layers of rubber a substance is produced which is solid and homogeneous throughout its thickness and at the same time resilient or springy and of such character that it is not liable to be punctured, but, when punctured, is susceptible of being repaired with facility. After the fabric is prepared in the manner described it is exposed to a current of hot air or placed in a chamber heated to a temperature of about 100° Fahrenheit until all of the liquids employed in the composition are evaporated and the gummy substances of said composition have concentrated the strands of the woven fabric and set or become part of the prepared fabric. The said prepared fabric is then ready to be interposed between and connected by vulcanization to the two layers of rubber in the manner before described. By reason of the interstices of the woven fabric being entirely occupied by the composition, as before described, it will be observed that air cannot follow the strands of the woven fabric between the layers of rubber, which is a material advantage, since it contributes to the solidity of the material as a whole.

When my improved prepared material is interposed between and connected by vulcanization to two layers of rubber, it will be seen that a material is produced which is at once non-absorbent, indestructible from moisture, mildew, and decay, strong, durable, and resilient, and therefore the said material is particularly advantageous for the manufacture of garden and fire hose, belting, and pneumatic tires, such as employed upon automobiles, carriages, and bicycles.

While I prefer to arrange my improved prepared fabric between two layers of rubber and connect it thereto in the manner described, I do not desire to be understood as confining myself to the same, as in some cases the prepared fabric may be used to advantage alone or in conjunction with but a single layer of rubber.

I have entered into a detailed description of the present and preferred embodiment of my invention in order to impart a full, clear, and exact understanding of the same. I desire it understood, however, that such changes in the ingredients of the composition and the proportions thereof may be made in practice as fairly fall within the scope of my claims.

Having described my invention, what I claim, and desire to secure by Letters Patent, is—

1. The herein-described fabric composed of a woven fabric, and a composition incorporated with the woven fabric and covering the strands and occupying the interstices thereof; the said composition comprising gum-mastiche, gum-shellac, gum-sandarac, gum-asphaltum and Burgundy pitch, combined in the proportions and manner, substantially as specified.

2. The herein-described composition for treating woven fabrics consisting of the solution made up of gum-mastiche, gum-shellac, gum-sandarac, and methylated spirits combined in the manner and proportions, substantially as specified, and a second solution made up of gum-asphaltum, Burgundy pitch and spirits of turpentine, combined in the manner and proportions, substantially as specified; the said solutions being combined in the proportions of about thirty-five per cent. of the first to sixty-five per cent. of the second.

In testimony whereof I have hereunto set my hand in presence of two subscribing witnesses.

JARED HENRY BEAMER.

Witnesses:
J. J. MANNING,
J. G. MANNING.